(No Model.)
J. B. LIGON.
COIN CONTROLLED TIRE INFLATER.
No. 595,639. Patented Dec. 14, 1897.
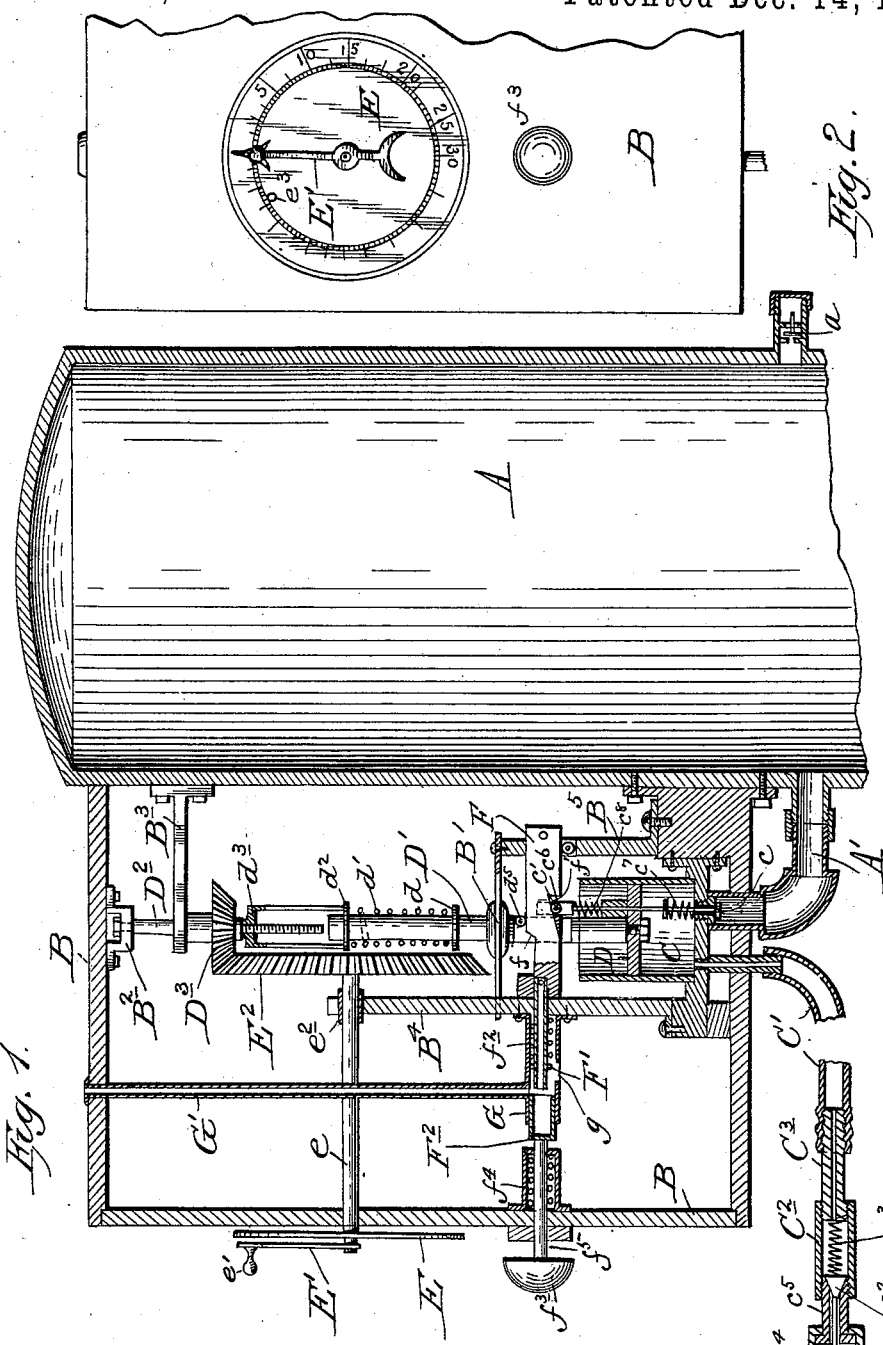
Witnesses
Franck L. Ourand
George J. Weber
Inventor
John B. Ligon,
E.W. Bradford
Attorney

UNITED STATES PATENT OFFICE.

JOHN BARROWS LIGON, OF JACKSON, MISSISSIPPI, ASSIGNOR OF TWO-THIRDS TO NEWTON LAFAYETTE WINGO, OF SAME PLACE, CHARLES T. CATES, JR., OF KNOXVILLE, TENNESSEE, AND VICTOR CAMERON BARRINGER, OF SAN ANTONIO, TEXAS.

COIN-CONTROLLED TIRE-INFLATER.

SPECIFICATION forming part of Letters Patent No. 595,639, dated December 14, 1897.

Application filed July 31, 1897. Serial No. 646,577. (No model.)

*To all whom it may concern:*

Be it known that I, JOHN BARROWS LIGON, a citizen of the United States, residing at Jackson, in the county of Hinds and State of Mississippi, have invented certain new and useful Improvements in Coin-Controlled Tire-Inflaters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my said invention is to provide an apparatus to be operated through the introduction of a coin of predetermined value for inflating pneumatic tires to any pressure desired automatically; and it consists in the construction and arrangement of parts whereby this object is accomplished, as will be hereinafter more fully described and claimed.

Referring to the accompanying drawings, which are made a part hereof and on which similar letters of reference indicate similar parts, Figure 1 is a central vertical section through an apparatus embodying said invention, and Fig. 2 a front elevation of a portion of the same.

In said drawings the portions marked A represent the tank in which the air for use in inflating the tires is stored under pressure greater than what will be required in any tire; B, the case for inclosing the operating mechanism; C, the piston-chamber; D, the piston; E, a dial; E', an indicator-hand and operating-crank; F, a sliding support for the piston-rod, and G the coin-receiving tube.

Said storage-tank A is of any suitable size and construction for the purpose. It has a connection $a$, containing a suitable valve and cap at one side, with which it may be connected with an air-pump to be filled with the air under the desired pressure.

The casing B is of any suitable material and form to properly inclose and protect the operating parts. It is secured to and supported from the side of the tank A, as shown.

The piston-chamber C is of suitable size and form and is supported in the lower part of the casing B on a base-plate provided therefor. A pipe A' connects said chamber with the tank A, and a valve $c$ in said pipe controls the flow of air, as will be presently described. Another tube C' leads out from said chamber and has on its outer end a connection for connecting to the nipple of the tire to be inflated. Said connection consists of the longitudinally-perforated parts $C^3$, $C^2$, $c^5$, and $c^4$, joined together, the latter being interiorly screw-threaded and mounted to turn on the part $c^5$, whereby the connection with the nipple is made. Said part $C^2$ is large enough to accommodate a spring $c^3$, which bears against the end of the valve $c^2$, which seats in the end of the part $c^5$, and is thus normally held closed. The valve is provided with a stem which extends through said part $c^5$ into the part $c^4$ and is provided with an enlarged end with a serrated face which, when the connection is made, comes in contact with the end of the nipple and forces back said valve from its seat, thus permitting the air to flow through the connection into the tire. The piston D is mounted to operate in said chamber and has a stem D' extending up therefrom through a bearing B', which is mounted on suitable supports. A collar $d$ is fixed on said stem above said bearing, and a spring $d'$ is mounted thereon. Another collar $d^2$ is mounted loosely on the top of said spring, which collar is connected with a nut $d^3$, with which a screw-threaded rod $D^2$ engages. Said rod is mounted to rotate in bearings formed in suitable supports $B^2$ and $B^3$, appropriately attached to the casing, and has a gear-wheel $D^3$ rigidly secured thereto.

The dial E is mounted on the front of the casing and is graduated to indicate pounds pressure. The hand E' is formed with a hand-hold $e'$, by which it is turned. At any point it will indicate the pounds pressure under which the apparatus will then inflate the tire, as will be presently described. It is mounted on the end of a shaft $e$, which is journaled in a bearing in the casing under the center of said dial, and another $e^2$ on the top of the standard $B^4$, and has the gear-wheel $E^2$ on its inner end. Said gear-wheel meshes with the gear-wheel $D^3$, and when the hand $E'$ is turned it will thus be seen that through the operation of these gears and the connecting parts the spring $d'$ will be compressed or allowed to expand and the downward pressure upon the piston thus controlled.

The sliding support F is formed with a stem $F'$, which may be a section of pipe, as shown, or made of the same piece as said main part, and is mounted to slide transversely in ways in the standard $B^4$ and another standard $B^5$ on the opposite side of the piston-stem. In the top of said support is formed a notch having an inclined shoulder $f$ at its inner end, said incline being at a sharp angle, as shown, for a purpose to be presently described. In its lower edge is formed a notch $f'$ in the form of a long incline terminating in a square shoulder at its inner end. A roller $d^5$ is mounted on the side of the piston-stem and rests, when in its normal position, on the top edge of said support just beyond the incline $f$, and thus supports said stem and the piston when there is no air-pressure in the chamber C. The stem of the valve $c$ extends up through the piston to alongside said support and has a roller $c^6$ mounted thereon, which bears upon the incline $f'$ in the under side thereof. Springs $c^7$ and $c^8$ normally hold said valve up as far as the contact of said roller with said incline will permit, which when in its normal position permits it to be entirely closed upon its seat. The stem $F'$ extends out through the standard $B^4$ into the tube G, which is secured at its inner end to the outside face of standard around the way in which said stem is mounted. A spring $f^2$, mounted around said stem between a collar near its outer end and the face of said standard, normally holds said support back in the position shown in Fig. 1. Another short tube $F^2$ is mounted to slide in the outer end of said tube G, being mounted on a stem $f^5$, which is mounted in an aperture in the side of the casing and has a push-button $f^3$ on its outer end. A spring $f^4$ normally holds the same in its outer position.

The coin-receiving tube G is secured to the side of the standard $B^4$ at its inner end in a horizontal position, and a vertical conduit $G'$ is connected thereto for receiving the coins and conducting them thereto, the mouth of said conduit preferably being in the top of the casing, as shown. The outer end of the stem $F'$ and the inner end of the tube $F^2$ are so positioned when in their normal positions that one is just at each side of the opening into the tube G from the conduit $G'$, so that the coin when dropped into said conduit falls into the tube G on edge between said parts and forms a face-plate between them, by which the stem $F'$ and support F may be pushed in by pushing on the push-button $f^3$, as will be readily understood. An opening $g$ is formed in the bottom of said tube G a short distance in front of the point where the coin is received of sufficient size to allow said coin to drop through to the receiving-box below, from which it may be removed through any suitable door provided for the purpose. The distance of said coin-discharge opening from the receiving-point in said tube is the distance which it is desired to push in the support F to operate the machine, as will be presently described.

The operation of the machine may be stated as follows: The tank A is pumped full of air under the pressure needed to supply the requirements of the machine for the length of time desired. When the pressure becomes too low, it is again pumped up by attaching any ordinary or suitable air-pump to the connection $a$, as will be readily understood. Said tank being so filled and the parts of the machine being in their normal positions, as shown in Fig. 1, and it being desired to fill a tire therefrom, the user first attaches the valved connection $c^4$ to the tire-nipple. He then turns the indicator-hand $E'$ until it points to the number on the dial which indicates the number of pounds pressure desired in the tire, a stop $e^3$ limiting the motion and preventing more than one revolution. He then drops the coin of the required denomination into the conduit, which falls upon its edge between the ends of $F'$ and $F^2$, as before described. He then pushes in the knob or push-button $f^3$ as far as it will go, which carries back the support F to a point where the corner at the top of the inclined shoulder $f$ will barely pass under the center of the roller $d^5$. The pressure of the spring $d'$ being exerted against said piston-stem in a downward direction operates to force the same down until said roller strikes the bottom of the notch very quickly, carrying the support F back the length of the distance between the vertical planes of the incline with a sudden jerk, which takes the end of $F'$ away from the coin and permits said coin to drop through the opening $g$. This arrangement also precludes the possibility of the user filling more than one tire without depositing the coins required, as by holding in the push-button until other connections had been made. As the support F is pushed in the incline $f'$ on its under side operates through the roller $c^6$ and the valve-stem to force said valve $c$ downward off its seat, which permits the compressed air to rush through the pipe $A'$ into chamber C below the piston D. The turning of the shaft $e$ by the indicator-hand $E'$ has operated through the gearing to compress the spring $d'$ until it exerts a down pressure on the piston equal to the pressure desired in the tire, the spring and parts being adjusted to secure this result. The air therefore rushes in through the pipe C' and connection and fills the tire until the desired pressure is secured, when the excess of pressure operates to lift the piston against the force of the spring $d'$ until the roller $d^5$ is lifted above the notch in the top of the support, when the spring $f^2$ draws said support outward to its normal position, which permits the springs $c^7$ and $c^8$ to force the valve $c$ upward and close the same, thus shutting off the supply of air from the tank automatically. The tire is then disconnected and the operation repeated as often as desired until the pressure in the tank is so far exhausted as to be inoperative, when it is again pumped up, as before described. The end of the tube $F^2$ being large enough to receive the end of the stem $F'$ the pushing in of the knob $f^3$ without first depositing the coin cannot effect an operation, and as the tubes G and G' are made of the respective dimensions of the coin required no other can be successfully used.

Having thus fully described my said invention, what I claim as new, and desire to secure by Letters Patent, is—

1. In an apparatus for inflating tires, the combination of an air-storage tank, a chamber connected thereto by a valve-controlled port, a connection leading from said chamber to the tire, mechanism for operating said valve which becomes operative upon the insertion of a coin, and mechanism for regulating the air-pressure in said chamber to different degrees, substantially as set forth.

2. In a coin-controlled tire-inflating apparatus, the combination of the storage-tank, the piston-chamber, the port between them, the valve in said port, a piston in said chamber, a spring arranged to normally hold said piston against the air-pressure in said chamber, gearing connected with an indicator on the outside of said casing, means operated by said gearing for regulating the pressure of said spring, and means for operating said valve which requires the insertion of a coin to render it operative, substantially as set forth.

3. In a coin-controlled tire-inflating apparatus, the combination of the air-storage tank, the piston-chamber connected therewith by a valve-controlled port, a tube leading from said chamber and provided with means for attachment to the tire-nipple, the piston mounted in said chamber and provided with the stem, the spring on said stem, means for controlling the pressure of said spring connected with an indicator on the outside of the casing, the sliding support F formed with an offset in its top and an incline in its lower edge, an engaging part on said piston-stem which rests on said top edge and one on the valve-stem which rests in the incline in its lower edge, the spring for normally holding said support in position to keep the valve closed, the two-part operating-stem arranged with their adjacent ends at each side of the coin-receiving opening, the coin-receiving tube and conduit, all substantially as set forth.

4. In a coin-controlled tire-inflating apparatus, the combination of the storage-tank, the piston-chamber connected therewith by a valve-controlled port, means for connecting said chamber with the tire-nipples, a piston in said chamber, a pressure-regulating device connected with said piston, a two-part operating device the adjacent ends of which are on each side of the coin-receiving point, and means for returning the parts to their normal positions after being operated, substantially as set forth.

5. In a coin-controlled tire-inflating apparatus, the combination of the tank, the piston-chamber, the piston and its stem, means for exerting, regulating and indicating a pressure upon said piston, a support upon which a part of the piston-rod rests, which support is formed with an offset with an abrupt angle just at the point which will come under the part which rests on said support when it is pushed into operative position, whereby the pressure upon said stem will force it down and the support back somewhat beyond the limit of the movement by the push-bar, a two-part push-bar connected with said support the end of its outer part extending outside the casing and the adjacent ends of the two parts being positioned normally each side of the coin-receiving point, the coin-receiving tube, the valve-controlled port leading from the tank to the piston-chamber, the stem of said valve being connected to and operated by said support to be opened, and closed by the springs, and means for connecting the tire-nipples with said chamber, substantially as set forth.

6. In a coin-controlled tire-inflating apparatus, the combination of the storage-tank, the inflating apparatus including a piston under controlled pressure, means for supporting said piston normally, a notch in said support in front of the point where it is normally connected with said piston which notch has an abrupt shoulder, whereby when said support is operated it is given a sudden jerk at the point where it is desired to deposit the coin, substantially as set forth.

7. In a coin-controlled tire-inflating apparatus, the combination of the storage-tank, the chamber connected thereto by a valve-controlled port, means for regulating the pressure in the chamber to different degrees, as desired and coin-controlled operating mechanism, substantially as set forth.

8. In a coin-controlled tire-inflating apparatus, the combination of the storage-tank, the chamber connected therewith by a valve-controlled port, a connection to lead to the tire, mechanism for controlling and operating the apparatus which requires the insertion of a coin to become operative, and includes a push-bar formed in two parts arranged to receive the coin between them, and a separate spring-operated part arranged to jerk one part of said push-bar away from the other to release the coin at the end of its movement, substantially as set forth.

In testimony whereof I affix my signature in presence of two witnesses.

JOHN BARROWS LIGON.

Witnesses:
D. H. HOLDER,
O. J. WAITE.